United States Patent
Wyland

(10) Patent No.: US 7,225,216 B1
(45) Date of Patent: May 29, 2007

(54) METHOD AND SYSTEM FOR A FLOATING POINT MULTIPLY-ACCUMULATOR

(75) Inventor: David C. Wyland, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 317 days.

(21) Appl. No.: 10/192,391

(22) Filed: Jul. 9, 2002

(51) Int. Cl.
*G06F 7/52* (2006.01)

(52) U.S. Cl. ..................................................... 708/501

(58) Field of Classification Search ................. 708/501
See application file for complete search history.

(56) References Cited

U.S. PATENT DOCUMENTS

| | | | | |
|---|---|---|---|---|
| 5,517,438 | A | * 5/1996 | Dao-Trong et al. | 708/501 |
| 5,790,444 | A | * 8/1998 | Olson et al. | 708/501 |
| 5,999,960 | A | * 12/1999 | Gerwig et al. | 708/500 |
| 6,256,655 | B1 * | 7/2001 | Ezer et al. | 708/501 |
| 6,381,624 | B1 * | 4/2002 | Colon-Bonet et al. | 708/501 |
| 6,697,832 | B1 * | 2/2004 | Kelley et al. | 708/501 |
| 6,813,626 | B1 * | 11/2004 | Chng et al. | 708/501 |
| 2003/0041082 | A1* | 2/2003 | Dibrino | 708/501 |
| 2003/0126174 | A1* | 7/2003 | Kawata | 708/501 |

* cited by examiner

*Primary Examiner*—D. H. Malzahn
(74) *Attorney, Agent, or Firm*—Patterson & Sheridan, L.L.P.

(57) ABSTRACT

Aspects for performing a multiply-accumulate operation on floating point numbers in a single clock cycle are described. These aspects include mantissa logic for combining a mantissa portion of floating point inputs and exponent logic coupled to the mantissa logic. The exponent logic adjusts the combination of an exponent portion of the floating point inputs by a predetermined value to produce a shift amount and allows pipeline stages in the mantissa logic, wherein an unnormalized floating point result is produced from the mantissa logic on each clock cycle.

16 Claims, 2 Drawing Sheets

METHOD AND SYSTEM FOR A FLOATING POINT MULTIPLY-ACCUMULATOR

FIELD OF THE INVENTION

The present invention relates to providing a floating point multiply-accumulator that can do an accumulate on each clock.

BACKGROUND OF THE INVENTION

Digital signal processing (DSP) algorithms are often defined using floating point numbers. The principle element of most DSP algorithms is the multiply-accumulate, where two numbers are multiplied, then added to an accumulating result. A common DSP algorithm is the FIR (finite impulse response) filter algorithm, where almost all operations are multiply-accumulate operations. These algorithms can be implemented in floating point (numbers expressed as a mantissa and an exponent) or fixed point numbers (numbers represented in integer or fractional notation).

Although floating point numbers are considered easier to work with by simplifying program coding and giving more accurate results compared to fixed point numbers, DSP algorithms are often implemented using fixed point numbers in fixed point hardware, because floating point multiply-accumulator hardware is usually slower than fixed point. FIG. 1 illustrates a block diagram of a typical, prior art fixed point multiply-accumulator (MAC) unit. As shown, the MAC unit includes a multiplier 10 that multiplies sample data values 12 ($X_o$) and coefficient values 14 ($A_i$). An adder 16 sums an accumulated value from an accumulator register 18 with the output of the multiplier 10 to provide the result.

Floating point DSP hardware is complicated and slow because of the floating point add operation on the output of the multiplier and the contents of the accumulator. Commonly, the two floating point numbers to be added are compared, and one of the two numbers is shifted to align the decimal points before the add. In hardware, the comparison occurs by subtracting the exponents of the two numbers. The result of this subtraction defines which number will be right shifted and how many positions it will be shifted. Since a decision must be made just before the add occurs, the add operation cannot be pipelined, thus eliminating the ability to do a multiply accumulate on each clock. In contrast, in fixed point MACs, no shift decision is involved, thus allowing a multiply-accumulate to occur on each clock. This difference results in the floating point MAC running at about half the speed (or less) than the fixed point MAC.

Accordingly, what is needed is a system and method for a floating point MAC that can do a multiply accumulate on each clock. The present invention addresses such a need.

SUMMARY OF THE INVENTION

Aspects for performing a multiply-accumulate operation on floating point numbers in a single clock cycle are described. These aspects include mantissa logic for combining a mantissa portion of floating point inputs and exponent logic coupled to the mantissa logic. The exponent logic adjusts the combination of an exponent portion of the floating point inputs by a predetermined value to produce a shift amount and allows pipeline stages in the mantissa logic, wherein an unnormalized floating point result is produced from the mantissa logic on each clock cycle.

Through the present invention, a straightforward and efficient approach to floating point MACs is provided. In accordance with the invention, a floating point multiplier-accumulator achieves similar performance to fixed point multiplier-accumulator units. These and other advantages of the present invention will be more readily understood in conjunction with the following detailed description and accompanying drawings.

DETAILED DESCRIPTION

The present invention relates to a floating point multiply-accumulator that can do an accumulate on each clock. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
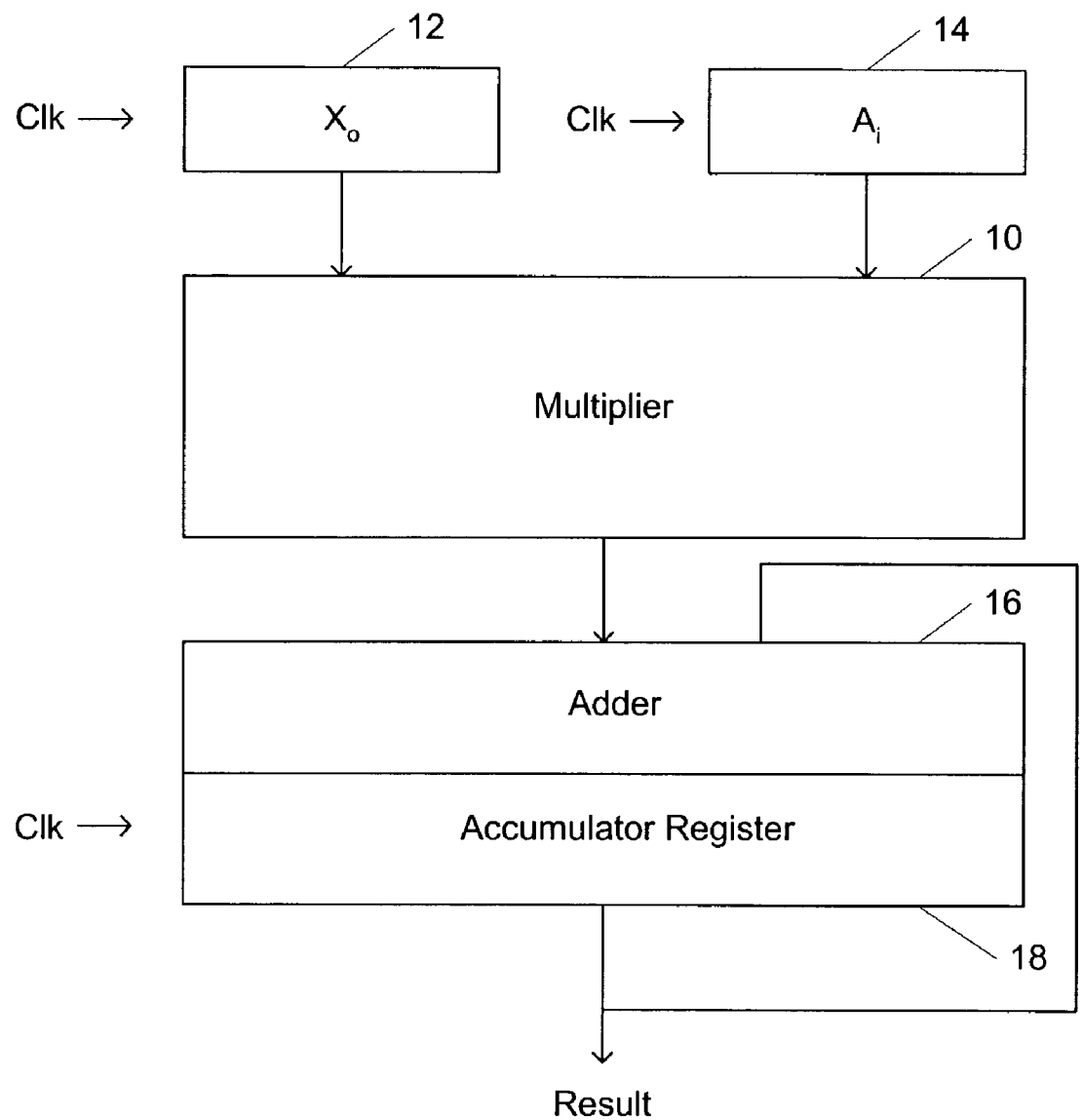
FIG. 1 illustrates a block diagram of a prior art fixed point multiply-accumulator.
Figure 2:
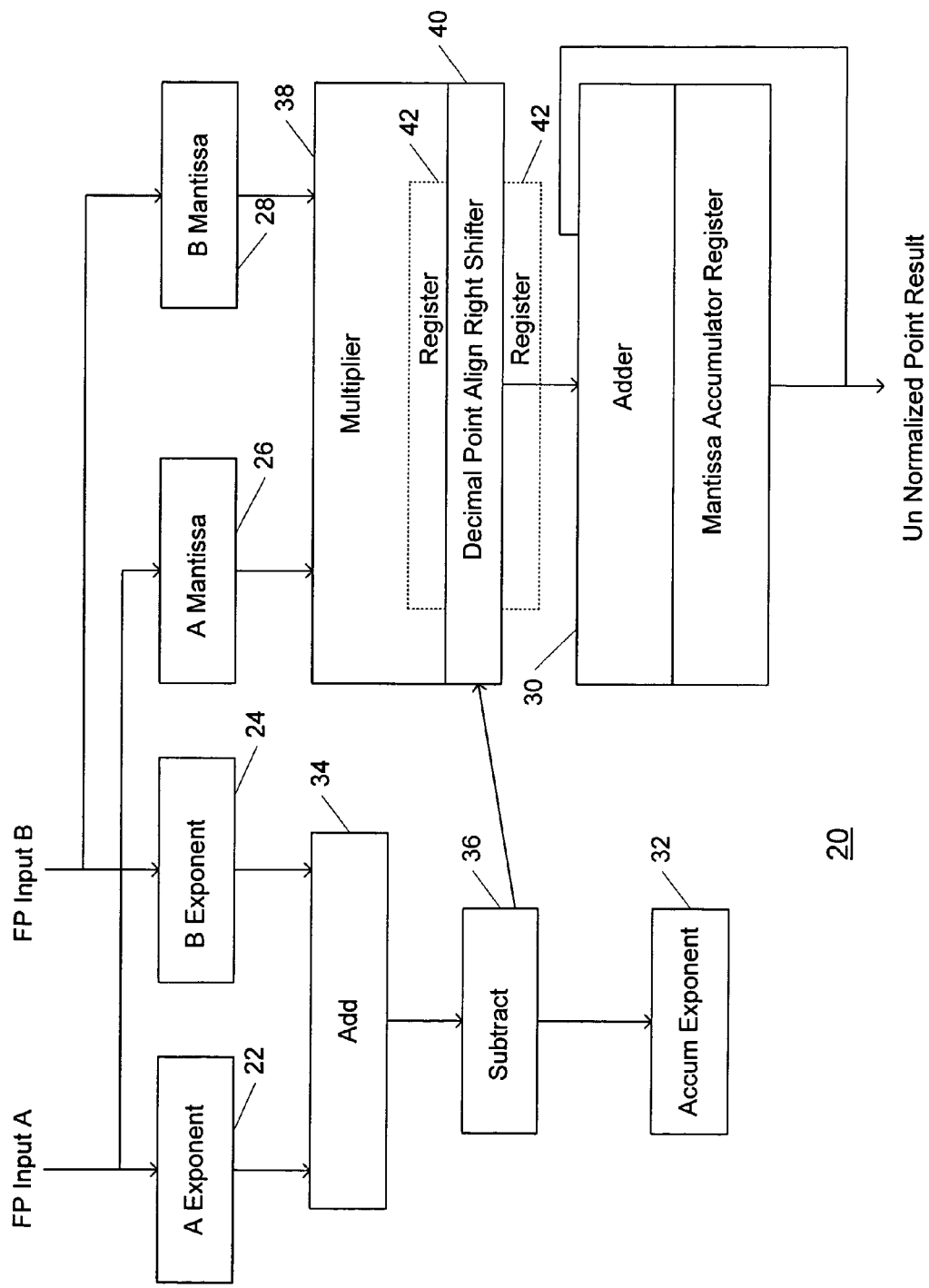
FIG. 2 illustrates a block diagram of a block floating point multiply-accumulator in accordance with the present invention.

FIG. 2 shows a floating point multiply-accumulator (MAC) 20 in accordance with the present invention. As shown, the MAC 20 includes registers 22, 24, 26, and 28 for storing the exponents and mantissas portions of input floating point numbers A and B. The exponent registers 22 and 24 provide values to an add unit 34. The add unit 34 provides a value to a subtractor 36. An accumulated exponent unit 32 also provides a value to the subtractor 36. The subtractor 36 provides the result to a shifter aligner 40 of a multiplier 38. The mantissa registers 26 and 28 provide values to the multiplier 38. The multiplier 38 provides values to an adder/accumulator 30. The output of the adder/accumulator 30 is fed back to itself every clock cycle.

In order to create a floating point multiplier-accumulator (MAC) 20 that can perform a multiply-accumulate on each clock, un-normalized numbers are allowed in adder/accumulator 30 and a fixed exponent value 32 is assigned to MAC 20 that is larger than the expected sum of any possible incoming exponents 22 and 24 (i.e., a block floating point combination). In a preferred embodiment the adder/accumulator 30 is made to be sufficiently wide such that it will handle any result from the multiplier 38. The wide accumulator adds minimal cost to the system. The input exponents 22 and 24 are combined via add logic 34 and the resulting sum is reduced by the accumulator exponent 32 via subtraction logic 36. The resulting value determines a shift amount for a decimal point alignment of the output of multiplier logic 38.

Through the present invention MAC 20, the sum of the input exponents 22 and 24 will always be less than the accumulator exponent 32 and the result of the multiplication of the input mantissas 26 and 28 via multiplier logic 38 will always be the number shifted. Thus, no decision is required just before the accumulate operation, as occurs in the conventional systems.

Without the need to wait for a decision just before the accumulate operations, the present invention MAC 20 supports the inclusion and use of pipeline stages or registers anywhere in the data path from the multiplier 38 through decimal point align shifter 40 to the input to the adder/accumulator 30. For example, pipeline registers can be placed before and after the decimal point align shifter 40, as shown by the dashed blocks 42. With such pipeline (stages) before and after the decimal point align shifter 40, the floating point MAC 20 can perform a multiply-accumulate on each clock. In this manner, the floating point multiplier-accumulator 20 achieves similar performance to fixed point multiplier-accumulator units in terms of speed while enjoying the advantages, such as better precision, that are associated with the use of floating point numbers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for performing a multiply-accumulate operation on floating point numbers on each clock cycle, the system comprising:
    mantissa logic for combining a mantissa portion of floating point inputs, the mantissa logic including at least one pipeline stage; and
    exponent logic coupled to the mantissa logic for adjusting a combination of an exponent portion of the floating point inputs by a predetermined value to produce a shift amount, the predetermined value being fixed in contrast to the exponent portion of the floating point inputs,
    wherein the mantissa logic produces an unnormalized floating point result on each clock cycle based on the shift amount produced by the exponent logic.

2. The system of claim 1, wherein the mantissa logic further comprises a multiplier for multiplying the mantissa portion of the floating point inputs.

3. The system of claim 2, wherein the multiplier comprises an align shifter for receiving the shift amount from the exponent logic and shifting a product of the mantissa portion of the floating point inputs.

4. The system of claim 3, wherein the mantissa logic further comprises an accumulator coupled to the multiplier for adding the shifted product of the mantissa portion of the floating point inputs with an accumulated mantissa value to produce the unnormalized floating point result.

5. The system of claim 1, wherein the exponent logic further comprises adder logic for adding the exponent portion of the floating point inputs and subtraction logic for reducing a sum of the exponent portion of the floating point inputs by the predetermined value.

6. The system of claim 5, wherein the predetermined value is a value greater than a largest expected sum of the exponent portion of the floating point inputs.

7. A method for performing digital signal processing (DSP) involving a multiply-accumulate operation on floating point numbers on each clock cycle, the method comprising:
    combining a mantissa portion of floating point inputs using mantissa logic, the mantissa logic including at least one pipeline stage;
    adjusting a combination of an exponent portion of the floating point inputs by a predetermined value to produce a shift amount using exponent logic, the predetermined value being fixed in contrast to the exponent portion of the floating point inputs;
    producing an unnormalized floating point result on each clock cycle based on the shift amount produced by the exponent logic using the mantissa logic; and
    utilizing the unnormalized floating point result in a finite impulse response (FIR) filter algorithm.

8. The method of claim 7, wherein combining the mantissa portion of the floating point inputs further comprises multiplying the mantissa portion of the floating point inputs using a multiplier in the mantissa logic.

9. The method of claim 8, wherein combining the mantissa portion of the floating point inputs further comprises receiving the shift amount from the exponent logic and shifting a product of the mantissa portion of the floating point inputs using an align shifter in the multiplier.

10. The method of claim 9, wherein producing the unnormalized floating point result further comprises adding the shifted product of the mantissa portion of the floating point inputs with an accumulated mantissa value to produce the unnormalized floating point result using an accumulator in the mantissa logic, the accumulator being coupled to the multiplier.

11. The method of claim 7, wherein adjusting the combination of the exponent portion of the floating point inputs further comprises adding the exponent portion of the floating point inputs using adder logic in the exponent logic and reducing a sum of the exponent portion of the floating point inputs by the predetermined value using subtraction logic in the exponent logic.

12. The method of claim 11, wherein the predetermined value is a value greater than a largest expected sum of the exponent portion of the floating point inputs.

13. A floating point multiply accumulator comprising:
    a plurality of registers for storing exponent and mantissa portions of input floating point numbers;
    a multiplier for receiving the mantissa portions of the input floating point numbers and for aligning the exponent mantissa portions of the input floating point numbers;
    exponent logic coupled to the multiplier for adjusting a combination of the exponent portions of the input floating point numbers by a predetermined value to produce a shift amount, the predetermined value being fixed in contrast to the exponent portions of the input floating point numbers; and
    an adder/accumulator coupled to the multiplier for receiving the aligned mantissa portions of the input floating point numbers from the multiplier,
    wherein the adder/accumulator is wide enough to handle any unnormalized floating point result from the multiplier each clock cycle.

14. The floating point multiply accumulator of claim 13, wherein the predetermined value is a value greater than a largest expected sum of the exponent portions of the input floating point numbers.

15. The floating point multiply accumulator of claim 14, wherein the exponent logic further comprises adder logic for adding the exponent portions of the input floating point numbers stored-in the plurality of registers and subtractor logic for reducing a sum of the exponent portions of the input floating point numbers by the predetermined value to produce the shift amount.

16. The floating point multiply accumulator of claim 13, further comprising at least one pipeline stage, the at least one pipeline stage being situated between the multiplier and the adder/accumulator.

* * * * *